(12) United States Patent
Gong et al.

(10) Patent No.: US 7,873,628 B2
(45) Date of Patent: Jan. 18, 2011

(54) DISCOVERING FUNCTIONAL DEPENDENCIES BY SAMPLING RELATIONS

(75) Inventors: Yu Gong, Half Moon Bay, CA (US); Ron Gonzalez, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 270 days.

(21) Appl. No.: 11/388,680

(22) Filed: Mar. 23, 2006

(65) Prior Publication Data

US 2007/0226237 A1 Sep. 27, 2007

(51) Int. Cl.
G06F 7/00 (2006.01)
G06F 17/30 (2006.01)
(52) U.S. Cl. ........................ 707/714; 707/713
(58) Field of Classification Search ............... 707/1–10, 707/100–104.1, 714, 713
See application file for complete search history.

(56) References Cited

U.S. PATENT DOCUMENTS

| 5,481,703 | A  | * | 1/1996 | Kato ........................... 707/101 |
|---|---|---|---|---|
| 6,012,064 | A  |   | 1/2000 | Gibbons et al. |
| 6,353,826 | B1 |   | 3/2002 | Seputis |
| 6,496,819 | B1 |   | 12/2002 | Bello et al. |
| 6,615,206 | B1 |   | 9/2003 | Jakobsson et al. |
| 6,754,652 | B2 |   | 6/2004 | Bestgen et al. |
| 6,801,905 | B2 |   | 10/2004 | Andrei |
| 6,865,567 | B1 | * | 3/2005 | Oommen et al. ................ 707/2 |
| 6,934,695 | B2 |   | 8/2005 | Kase et al. |
| 7,007,009 | B2 |   | 2/2006 | Bestgen et al. |
| 7,007,032 | B1 |   | 2/2006 | Chen et al. |
| 7,010,521 | B2 |   | 3/2006 | Hinshaw et al. |
| 2005/0097072 | A1 |   | 5/2005 | Brown et al. |
| 2005/0102325 | A1 |   | 5/2005 | Gould et al. |
| 2005/0240615 | A1 |   | 10/2005 | Barsness et al. |

OTHER PUBLICATIONS

Frank Olken et al., "Random Sampling from Databases—A Survey," Mar. 22, 1994, pp. 1-54.
Frank Olken, "Random Sampling from Databases," 1993, 172 pages.
Frank Olken et al., "Random Sampling from B+trees," Proceedings of the International Conference on Very Large Data Bases, Amsterdam, 1989, 9 pages.
Dan E. Willard, "Optimal Sample Cost Residues for Differential Database Batch Query Problems," Journal of the Association for Computing Machinery, vol. 38. No. 1, Jan. 1991, pp. 104-119.

(Continued)

*Primary Examiner*—Khanh B Pham
*Assistant Examiner*—Navneet K Ahluwalia
(74) *Attorney, Agent, or Firm*—Hickman Palermo Truong & Becker LLP

(57) ABSTRACT

To discover functional dependencies in a large relation, a sample of tuples from the relation is collected. The sample is examined to determine whether one or more candidate functional dependencies exist just within the sample as a nominal dependency. When a nominal dependency is found in the sample, than all the tuples in the relation are examined to verify whether the nominal dependency holds for the whole relation. Candidate functional dependencies are disqualified when either a nominal dependency is found or when it is verified as functional dependency that holds for the entire relation.

28 Claims, 3 Drawing Sheets

OTHER PUBLICATIONS

Sumit Ganguly et al., "Bifocal Sampling for Skew-Resistant Join Size Estimation," ACM SIGMOD '96, Montreal, Canada, ACM, 1996, pp. 271-281.
Peter J. Haas et al., "Fixed-Precision Estimation of Join Selectivity," ACM, PODS, May 1993, Washington, D.C., pp. 190-201.
Yi-Leh Wu et al., "Applying the Golden Rule of Sampling for Query Estimation," ACM SIGMOD 2001, May 21-24 Santa Barbara, California, pp. 449-460.
Peter J. Haas et al., "On the Relative Cost of Sampling for Join Selectivity Estimation," SIGMODS/PODS '94, May 1994, Minneapolis, Minnesota, pp. 14-24.
Peter J. Haas et al., "Sequential Sampling Procedures for Query Size Estimation," 1992 ACM SIGMOD, Jun. 1992, pp. 341-350.
Richard J. Lipton et al., "Practical Selectivity Estimation through Adaptive Sampling," 1990, ACM, pp. 1-11.
Kenneth W. Ng et al., "On Reconfiguring Query Execution Plans in Distributed Object-Relational DBMS," Dec. 14-16, 1998, 1998 International Conference on Parallel and Distributed Systems, Dec. 1998, 9 pages.
Chun-Nan Hsu et al., "Semantic Query Optimization for Query Plans of Heterogeneous Multidatabase Systems," IEEE Transactions on Knowledge and Data Engineering, vol. 12, No. 6, Nov./Dec. 2000, pp. 959-978.
Fotis Barlos et al., "On Development of a Site Selection Optimizer for Distributed and Parallel Database Systems," CIKM '93, Washington D.C., USA, pp. 684-693.
Siegfried Bell et al., "Discovery of Data Dependencies in Relational Databases," Informatik VIII, University Dortmund, Germany, 6 pages.
Catherine Wyss et al., "Fast FDs: A Heuristic-Driven, Depth-First Algorithm for Mining Functional Dependencies from Relation Instances," Computer Science Dept., Indiana University Bloomington, IN, USA, pp. 1-23.
Yka Huhtala et al., "TANE: An Efficient Algorithm for Discovering Functional and Approximate Dependencies," The Computer Journal, vol. 42, No. 2, 1999, pp. 100-111.
Heikki Mannila et al., "Dependency Inference," Proceedings of the 13$^{th}$ VLDB Conference, Brighton 1987, pp. 155-158.
Iztok Savnik and Peter A. Flach, "Bottom-up Induction of Functional Dependencies from Relations," Jozef Stefan Institute, Ljubljana, Slovenija and Institute for Language Technology & Artificial Intelligence, Tilbury University, Tilburg, the Netherlands, 13 pages.

* cited by examiner

DISCOVERING FUNCTIONAL DEPENDENCIES BY SAMPLING RELATIONS

FIELD OF THE INVENTION

The present invention relates to data quality review and/or data profiling, and in particular, to discovery of functional dependencies in large bodies of data.

BACKGROUND

Functional dependencies are an important property in a database. Within a relational database, a functional dependency exists between two attributes A and B in a relation if for every value of A in a tuple of the relation the same value of B exists in the tuple. In other words, within a relation, B is functionally dependant on A if for every value in A for which there is an instance in a tuple, the same value of B exists in the tuple. To illustrate functional dependencies, the following relation T1, with attributes C1, C2, C3, C4, and C5, is provided.

| Relation T1 | | | | |
|---|---|---|---|---|
| C1 | C2 | C3 | C4 | C5 |
| APPLE | 10 | TREE | CA | A |
| APPLE | 10 | BUSH | CA | A |
| GRAPE | 20 | BUSH | CA | B |
| GRAPE | 20 | BUSH | NY | B |
| ORANGE | 30 | SHRUB | NY | C |

For every value of C1 in a tuple, the same value of C2 exists in the tuple. For example, when C1=APPLE for a tuple, the value for C2 in the tuple is always 10. In other words, when C1=APPLE, then the value 10 is always returned for C2. Thus, C2 functionally depends on C1.

On the other hand, C4 is not dependant on C3. For example, when C3=BUSH in a tuple in T1, C4 can either be CA or NY.

When B functionally depends on A, A is referred to herein as determining B. In the case of relation T1, C1 determines C2. An attribute B that depends on an attribute A is represented using the following notation: (A)>>B.

An attribute can be functionally dependant on multiple attributes. A set of attributes upon which an attribute functionally depends is referred to herein as a determining set and is represented using the following notation (A1, A2, . . . An)>>B. For every unique combination of values for attributes A1-$A_n$, for which there is an instance in a tuple, the same value for B is returned.

B is minimally functionally dependent on A when there is no other attribute that functionally depends on A that B functionally depends on. Specifically, there is no attribute B' such that (B')>>B and (A)>>B'. For example, relation T1 has the functional dependencies (C1)>>C2 and (C2)>>C5. C1>>C5 is a valid functional dependency; however, it is not minimal.

DISCOVERY OF FUNCTIONAL DEPENDENCIES

Functional dependencies are important for various reasons. First, functional dependencies enable ways of normalizing data to save storage space and provide dimensions by which to categorize data. Within a database, functional dependencies may not be known. Because of the importance of functional dependencies, an important function of database management is to examine a database to discover functional dependencies. An operation that examines a relation to find functional dependencies is referred to herein as functional dependency discovery.

Functional dependency discovery may be performed as part of Data Profiling and Data Quality Review. Data Profiling refers to determining the properties of a body of data, properties such as functional dependencies. Data Quality Review refers to determining whether a body of data confirms to properties that the data is expected to possess, such as functional dependencies that a database is expected or defined to have.

In order to establish a functional dependency between attributes, it must be determined that the functional dependency holds for every tuple in a relation. For example, to determine whether (C1)>>C2, attribute C1 and C2 in every tuple of T1 must be examined, to determine whether one value for C2 exists for any particular value in C1 throughout all the tuples in the relation. As another example, to determine whether $(A_1, A_2)$>>B, every attribute $A_1$ and $A_2$ in every tuple of T1 must be examined, to ensure that there is only value for any particular combination of values in $A_1$ and $A_2$ throughout all the tuples of the relation.

Some relations have a large number of attributes and/or tuples. Discovering functional dependencies derived from multiple attributes can require examining a very large number of combinations of columns. For example, to discover whether there is a functional dependency between B and any combination of attributes $A_1$-$A_n$, multiple combinations of $A_1$-$A_n$ must be considered and evaluated. As the number columns increase in a relation the number of combinations that must be considered expands factorially.

The effort to discover functional dependences in a relation with p tuples and n attributes has been calculated to be on an order as follows:

$$O(n^2 2^n p \log(p))$$

As shown by the above equation, the number of attributes in a relation more greatly impacts the effort required for functional discovery than does the number of tuples. However, the size of databases is greatly expanding, and thus the number of rows in a relation as a factor impacting functional dependency discovery is gaining importance.

Various techniques can be used that ameliorate the expenditure of resources. Most existing functional dependency discovery algorithms use heuristics algorithms that can reduce the average attribute-related complexity to $O(n^2)$. In those cases, the performance weight placed on the tuple-related processing becomes much larger.

Such techniques are described in, for example, "TANE: An Efficient Algorithm for Discovering Functional and Approximate Dependencies", by Yha Huhtale, et al., The Computer Journal, VOL. 42, no. 2, 1999, pages 100-111, and in "Discover of Data Dependencies in Relational Databases", Technical Report LS-8, Report-14, University of Dortmund, 1995. However, these techniques are inadequate for discovering functional dependencies of very large relations because either the techniques require too much memory or require too much computational effort to discover functional dependencies in determining sets.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
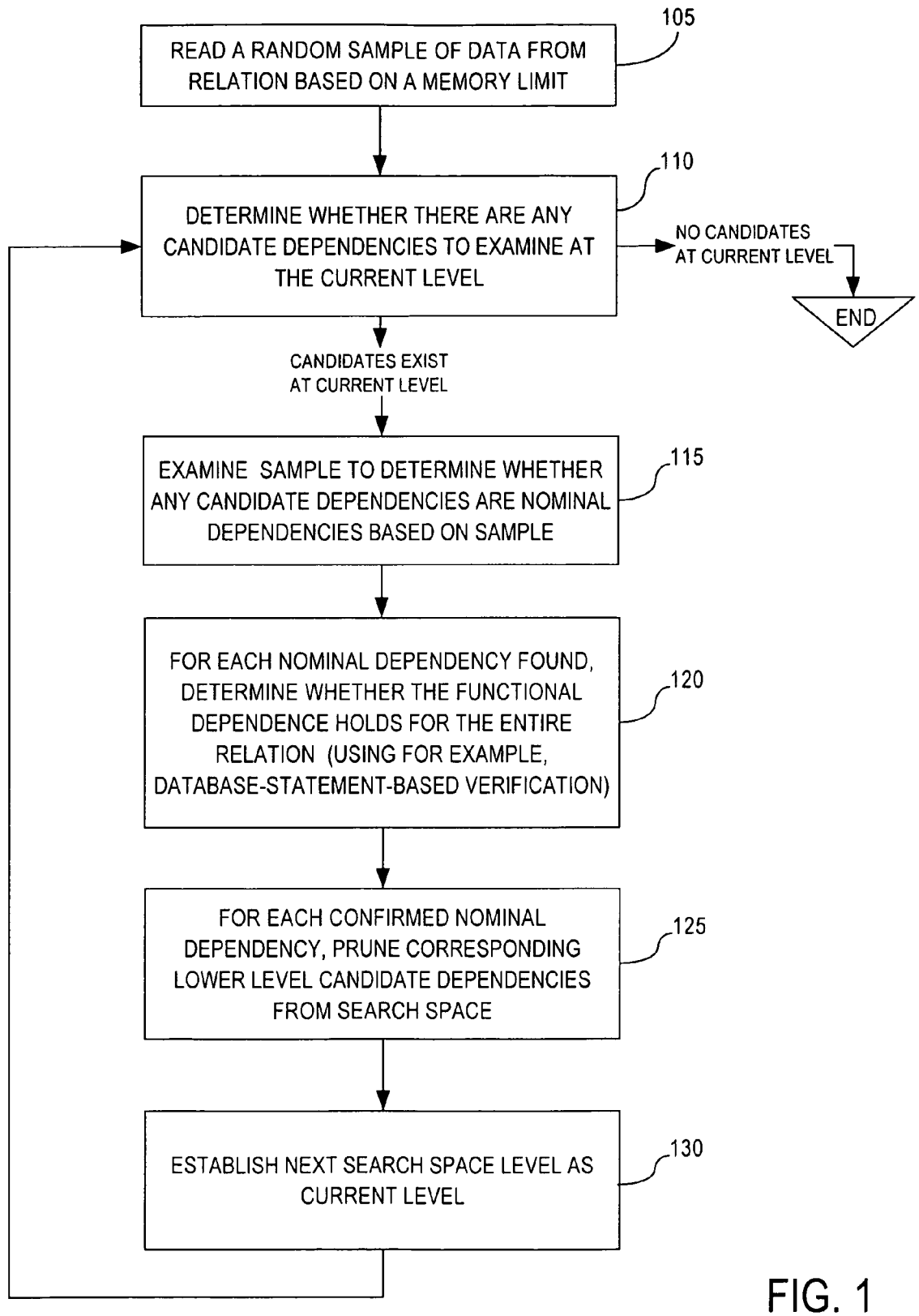
FIG. 1 is a flow chart of a procedure for performing functional dependency discovery according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for discovering functional dependencies in a large relation that are performed efficiently and/or within a memory limit.

As the term is used herein, a relation refers to any body of records that contain the same attributes or fields. The term tuple is used herein to refer to a record within the body of records. In a relational database, a table is analogous to a relation and a column is analogous to an attribute. In an object or object-relational database, a tuple corresponds to an object and an attribute corresponds to an object attribute. An object class defines the attributes of an object that belongs to the object class. An embodiment of the present invention is not limited to any kind of body of records, relation, or tuple.

According to an embodiment of the present invention, a sample of data from a relation is collected. The sample includes data for some but not all the tuples. The sample is examined to determine whether the candidate functional dependency holds within the sample. A candidate dependency that holds within the sample is referred to herein as a nominal dependency. When a nominal dependency is found, then a determination is made about whether the nominal functional dependency holds for the entire relation. On the other hand, if within the sample the candidate functional dependency does not hold, then the candidate functional dependency is ruled out as functional dependency in the entire relation. Determining whether a nominal dependency holds true for an entire relation is referred to herein nominal dependency verification.

The techniques take advantage of several properties of functional dependencies. First, if a functional dependency exists within a relation, then it must exist within a sample of the relation. Second, if a functional dependency does not exist within a sample of a relation, it cannot exist within the relation. Thus ruling out a functional dependency in a sample rules out the functional dependency in the entire relation. Finally, while it is true that a functional dependency that does exist in a relation can be established as a nominal dependency within a sample, the set of nominal dependencies established for a sample is over inclusive, that is, will always include nominal functional dependencies that actually hold within the relation plus possible other nominal functional dependencies that do not.

Other Optional Optimizations

In one or more embodiments, other optimizations may be used in conjunction with sampling to discover functional dependencies. These include pruning and database-statement-based discovery.

Pruning is based in part on a search space. A search space comprises possible functional dependencies in a relation, referred to herein as candidate dependencies. Each candidate dependency belongs to a level within the search space based on the number of member attributes in the determining set of a candidate dependency. At the highest level of a search space are candidate dependencies having a determining set with a single member; at the next lower level, the second level, are those candidate dependencies having determining sets with two members; at the next lower, the third level, are those candidate dependencies having determining sets with three members, and so forth. For example, for a given attribute E among attributes A, B, C, D, and E, the candidate dependencies at the highest level ($1^{st}$ level) in the search space include (A)>>E, (B)>>E, (C)>>E, (D)>>E, at the next lower level ($2^{nd}$ level) include, for example, (A, B)>>E, (A, C)>>E, (A, D)>>E, (B, C)>>E and at the third level (A, B, C)>>E, (A, B, D)>>E, and (B, C, D)>>E.

Once nominal dependency verification establishes that a candidate dependency for a given attribute is in fact a functional dependency for the entire relation, then candidate dependencies for the given attribute at the lower levels that include the determining set of the candidate dependency are pruned from the search space, that is, the relation is not further examined to determine whether the pruned candidate determining sets determine the given attribute.

For example, once it is determined that candidate dependency (A)>E is in fact a functional dependency within a relation, then candidate dependencies for E that include the determining set (A) are removed from the search space e.g. candidate dependencies for E based on such determining sets as (A, B), (A, C), (A, D) at the second level and (A, B, C), (A, B, D) at the third level.

There are various reasons that combinations that include a determining set can be pruned from the search space. First, once it is determined that a set of attributes are a determining set for a given attribute, then any other set of attributes that include the determining set is also a determining set for the given attribute. Second, only minimal functional dependencies may be of interest.

To improve efficiency, functional discovery can begin by evaluating possible functional dependencies based on higher level candidate dependencies. When pruning occurs at a higher level, a larger number of candidate dependencies are eliminated. The more candidate dependencies pruned the more work and resource usage avoided.

Database-Statement-Based Verification

In database-statement-based verification, a database server executes a database statement constructed to yield a result that specifies whether a particular candidate determining set is in fact a determining set. The database statement is submitted to a database server that manages or that can otherwise access the relation in issue. The results computed by the database server indicate whether the functional dependency holds.

For example, the following database statements may be issued to a database server to determine whether (A)>>B holds within a relation.

statement A: select count(count(1)) from <TABLE_NAME> group by A, B statement B: count(count(1)) from <TABLE_NAME> group by A If the result of these queries is the same (a number is expected for each), then the functional dependency (A)>>B holds for the entire relation. If not, then the functional dependency does not hold.

Also, the results of these queries are cached so that statements do not have to be recomputed. For example, to test A>>C, the result returned for statement B is needed. If the result is available in cache, then statement B does not have to be re-executed.

As the term is used herein, a database server is a combination of a set of integrated software components and an allocation of computational resources, such as memory and processes for executing the set of integrated software components on a processor, where the combination of software and computational resources are used for managing a database. Among other functions of database management, a database server governs and facilitates access to a database, processing requests by database clients to access the database. The database includes structured data. Structured data is data structured according to a metadata description defining the structure. Structured data includes relations, such as relational tables, object tables, and object-relational tables, and data structured according to the Extensible Markup Language ("XML"), such as XML documents.

Typically, clients of a database server may access data managed by a database server by issuing database commands to the database service. Typically, the database commands conform to a database language, such as a standard or proprietary form of SQL.

Database servers have many mechanisms for efficiently computing database statements and accessing data required for such computations. Such mechanisms include indexing, table partitioning, query execution plan optimization, and parallel processing. Database-statement-based verification allows such mechanisms to be exploited for functional dependency discovery.

Illustrative Embodiment

FIG. 1 is a flow chart depicting a procedure for functional dependency discovery according to an embodiment of the present invention. The procedure is used to determine what candidate dependencies within a search space are valid functional dependencies. The functional dependency discovery uses pruning and can use database-statement-based verification. It should be understood, however, that an embodiment of the present invention is not so limited.

At step 105, a sample of data (i.e. tuples) from a relation is read into memory. Preferably, the sample is random and its size is based on an amount of volatile memory that is available to a computer system for storing the sample and working data structures needed for determining functional dependencies within the sample.

Steps 110, 115, 120, 125 and 130 form a working loop that is executed iteratively. In each iteration of the loop, the candidate dependencies of a particular level ("current level") of the search space are examined. The first iteration of the loop is performed for the first or highest level. In each iteration, one or more candidate dependencies may be pruned from the search space.

At step 10, it is determined whether there are any candidate dependencies to examine at the current level. In the first iteration for the first level of the search space, there is always at least one candidate. However, in iterations for lower levels it is possible that all candidate dependencies have been pruned, in which case execution of the procedure ends. Otherwise, execution of the procedure proceeds to step 120.

At step 115, the sample is examined to determine whether any candidate dependencies for the current level are nominal dependencies. In the preferred embodiment, because the sample size is based on a memory limit, the data accesses needed to carry out the determination should be limited to volatile memory.

At step 120, for each nominal dependency found, it is determined whether the functional dependency holds for the entire relation. Preferably, if the relation is managed by a database server, the step is performed using database-statement-based verification.

At step 125, for each nominal dependency confirmed as a functional dependency in the entire relation in step 120, the corresponding dependencies at the lower levels are pruned from the search space. That is, the lower level candidate dependencies that include the determining set of the confirmed nominal dependency are pruned from the search space.

At step 130, the next lower search space level is established as the current level.

Alternative Embodiment

Techniques described for pruning candidate dependencies prune lower level candidates corresponding to a nominal dependency only after nominal dependency verification verifies that a nominal dependency is functional dependency. Pruning in this way is referred to herein as post-verification pruning. For example, in FIG. 1, pruning occurs within the working loop; only after nominal dependency verification of a nominal dependency are the corresponding lower level candidates pruned. As later described in further detail, there may be scenarios in which it is advantageous to prune lower level candidates once a candidate dependency has been determined to be a nominal dependency but before nominal dependency verification is undertaken for the nominal dependency. Pruning in this way is referred to herein as pre-verification pruning.

Figure 2:
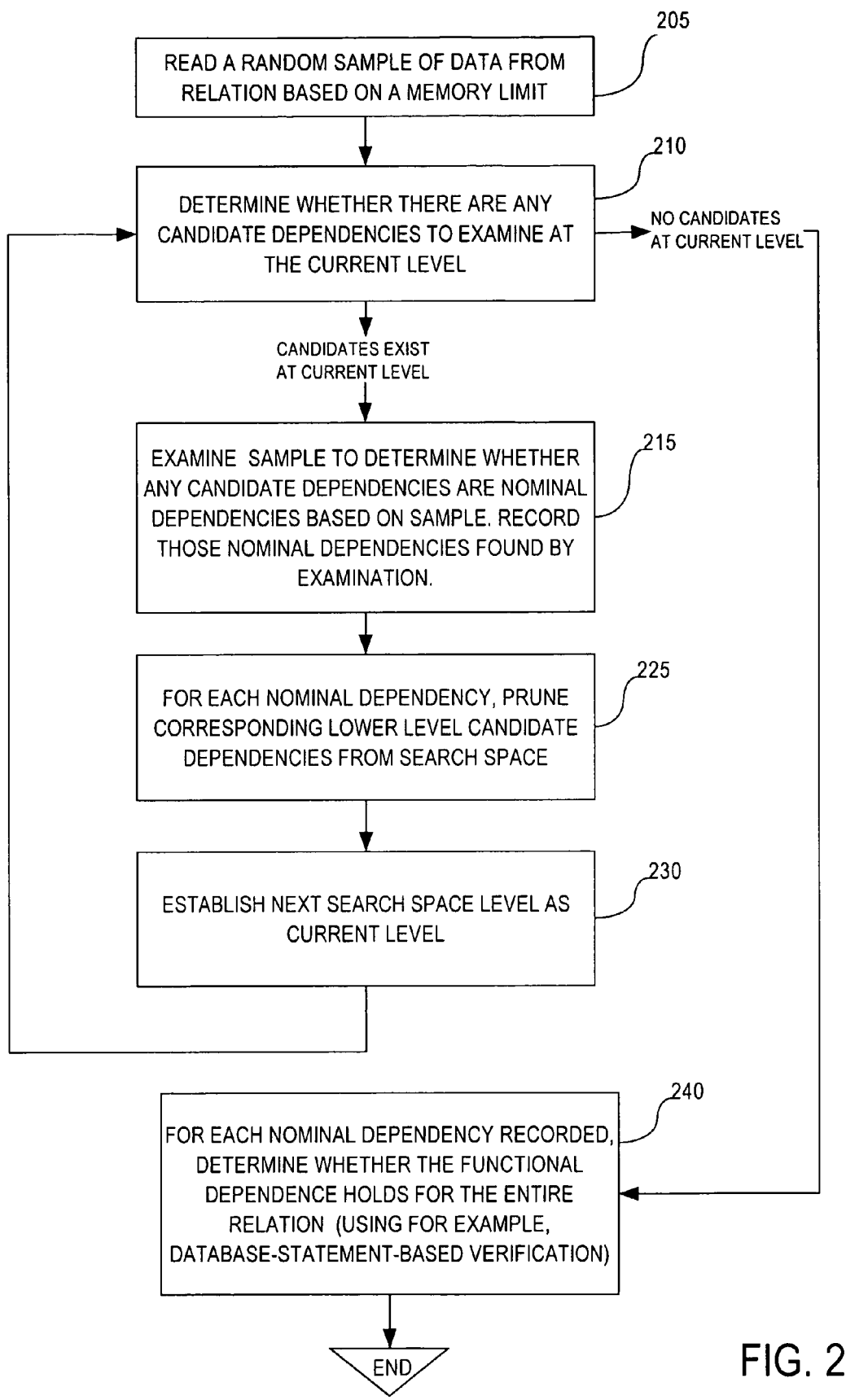
FIG. 2 is a flow chart of a procedure for performing functional dependency discovery according to an embodiment of the present invention.

FIG. 2 depicts a procedure for functional dependency discovery that uses pre-verification pruning. Referring to FIG. 2, at step 205, a sample of data (i.e. tuples) from a relation is read into memory.

Steps 210, 215, 225 and 230 form a working loop that is executed iteratively in a manner similarly described for FIG. 1. However, in each iteration, a candidate dependency may be pruned from the search space after it is determined to be a nominal dependency; nominal dependency verification is not performed before pruning the nominal candidate.

At step 210, it is determined whether there are any candidate dependencies to examine at the current level. If all candidate dependencies for the current have been pruned, the working loop ends and the procedure proceeds to step 240. Otherwise, execution of the procedure proceeds to step 215.

At step 215, the sample is examined to determine whether any candidate dependencies for the current level are nominal dependencies. The nominal dependencies found are recorded.

At step 225, for each nominal dependency found, the corresponding lower level candidates are pruned.

At step 230, the next lower search space level is established as the current level.

Step 240 is performed after the working loop ends. For each nominal dependency recorded, nominal verification is performed.

In an embodiment, for a recorded nominal dependency that failed nominal dependency verification, if any, the search is repopulated with the candidate dependencies pruned as result of pruning the nominal dependency. Functional dependency discovery for the newly repopulated search may be performed again.

Pre-verification and post-verification may be advantageous under different conditions. When the number of tuples in a relation is high and consequently the cost of nominal dependency verification is high, deferring nominal dependency verification can be beneficial. If on the other hand, there are a large number of attributes in the search space, earlier verification can earlier disqualify candidate dependencies as functional dependencies earlier.

It should be noted that an embodiment of the present invention may not use a database system, directly or indirectly. Preferably, sampling and/or nominal dependency validation is performed using a mechanism that can efficiently access and evaluate data in a relation, whether or not the relation was, is, and/or will be created, accessed, or maintained by a database system.

Hardware Overview

Figure 3:
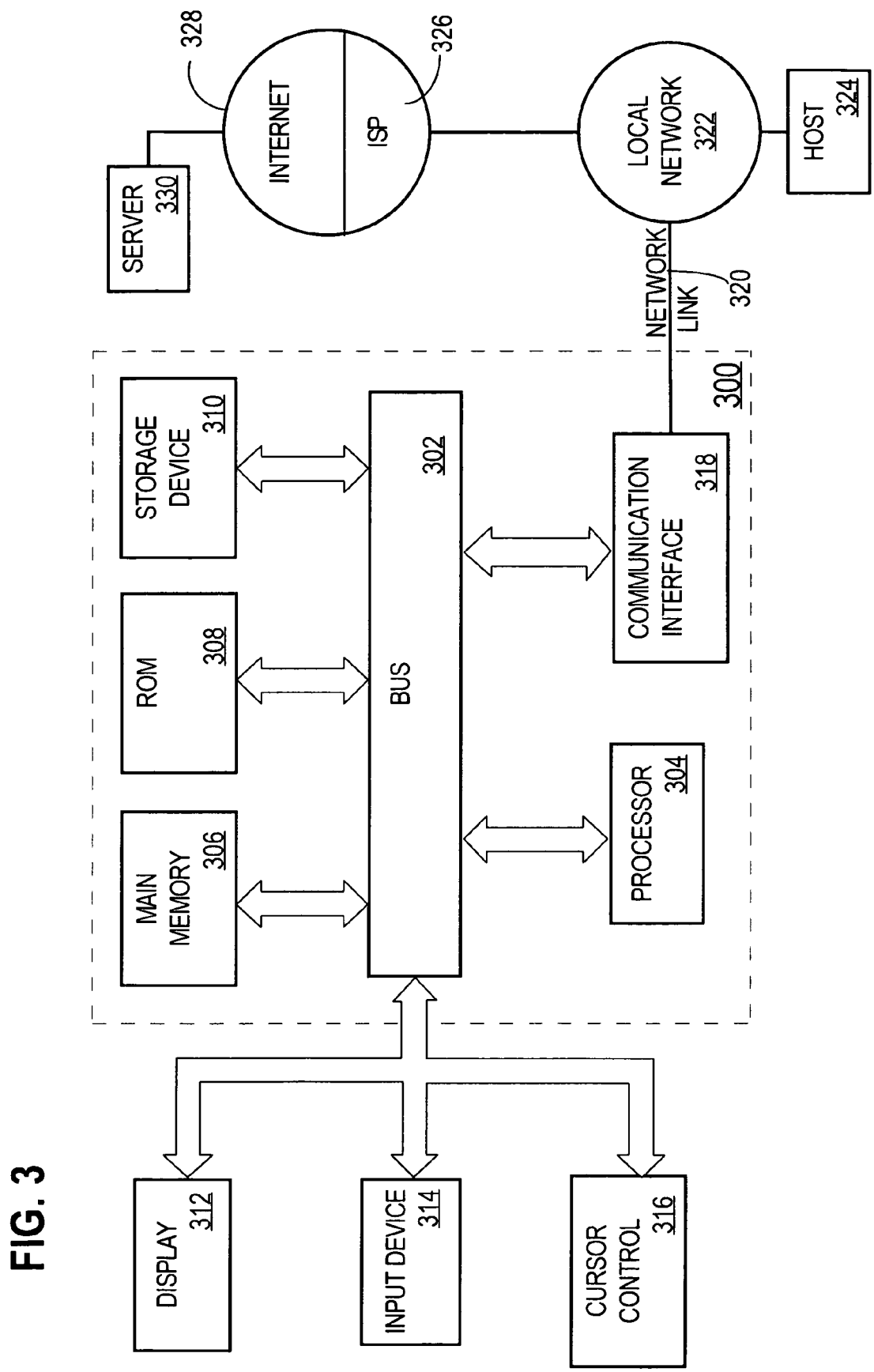
FIG. 3 is a diagram of a computer system that may be used in an implementation of an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for discovering functional dependencies within a relation, the method comprising computer implemented steps of:
    a computer system generating a sample of tuples from the relation, said tuples including a plurality of attributes;
    wherein the sample of tuples includes data for some but not all tuples in the relation;
    determining whether a certain candidate dependency from a search space of candidate functional dependencies exists within the sample;
    wherein said certain candidate dependency is based on a certain determining set of one or more attributes that determines a given attribute;
    if said certain candidate dependency exists within the sample, then performing the steps of:
        determining whether the certain candidate dependency exists within the entire relation;
        removing from the search space candidate functional dependencies that:
            determine the given attribute, and
            have a determining set that determines said certain determining set; and
        foregoing determining whether a candidate functional dependency removed from the search space exists within the sample; and
    if said certain candidate dependency exists within the entire relation, storing data which indicates that said certain candidate dependency is a functional dependency that holds within the relation.

2. The method of claim 1, wherein determining whether the certain candidate dependency exists within the entire relation includes constructing a database statement designed to yield a result that specifies whether the certain candidate dependency exists in the relation.

3. The method of claim 1, wherein generating a sample of tuples includes randomly generating a sample of tuples.

4. The method of claim 1, wherein the size of the sample is based on a memory limit.

5. A method for discovering functional dependencies within a relation, the method comprising computer implemented steps of:
    a computer system generating a sample of tuples from the relation, said tuples including a plurality of attributes;
    determining whether a plurality of candidate functional dependencies in a search space exist in the sample, each candidate dependency of said plurality of candidate functional dependencies having a determining set of one or more attributes of the tuples;
    wherein said search space is associated with levels, each level of said levels containing candidate dependencies of the search space that have a particular number of member attributes in the respective determining set, wherein an order is associated with levels and is based on the particular number of members in the determining sets in the respective candidate dependencies for each level of said levels;
    wherein determining whether a plurality of candidate functional dependencies in a search space exist within the relation includes:
        for each level of said search space beginning with the highest level:
            for each candidate dependency in said each level, determining whether said each candidate dependency exists in the sample as a nominal dependency;
            for each candidate dependency in said each level determined to be a nominal dependency, determining whether the nominal dependency exists within the entire relation; and
            for each nominal dependency determined to exist in the entire relation, removing from the search space one or more candidate dependencies:
                at a level lower than said each level of said each nominal dependency, and
                that have a determining set that includes the determining set of said each nominal dependency.

6. The method of claim 5, wherein determining whether the nominal dependency exists within the entire relation includes constructing a database statement designed to yield a result that specifies whether the nominal dependency exists in the relation.

7. The method of claim 5, wherein generating a sample of tuples includes randomly generating a sample of tuples.

8. The method of claim 5, wherein the size of the sample is based on a memory limit.

9. A method for discovering functional dependencies within a relation, the method comprising computer implemented steps of:
    a computer system generating a sample of tuples from the relation, said tuples including a plurality of attributes;
    determining whether a plurality of candidate functional dependencies in a search space exist in the sample, each candidate dependency of said plurality of candidate functional dependencies having a determining set of one or more attributes of the tuples;
    wherein said search space is associated with levels, each level of said levels containing candidate dependencies of the search space that have a particular number of member attributes in the respective determining set, wherein an order is associated with levels and is based on the particular number of members in the determining sets in the respective candidate dependencies for each level of said levels;

wherein determining whether a plurality of candidate functional dependencies in a search space exist within the relation includes:

for each level of said search space beginning with the highest level:

for each candidate dependency in said each level, determining whether said each candidate dependency exists in the sample as a nominal dependency, for each nominal dependency determined to exist in the sample, removing from the search space one or more candidate dependencies:

at a level lower than said each level of said each nominal dependency, and that have a determining set that includes the determining set of said each nominal dependency;

for each nominal dependency determined to exist in the sample, determining whether the nominal dependency exists within the entire relation.

10. The method of claim 9, wherein determining whether the nominal dependency exists within the entire relation includes constructing a database statement designed to yield a result that specifies whether the nominal dependency exists in the relation.

11. The method of claim 9, wherein generating a sample of tuples includes randomly generating a sample of tuples.

12. The method of claim 9, wherein the size of the sample is based on a memory limit.

13. A machine-readable volatile or non-volatile medium storing one or more sequences of instructions for discovering functional dependencies within a relation, which instructions, when executed by one or more processors, cause the one or more processors to perform steps comprising:

generating a sample of tuples from the relation, said tuples including a plurality of attributes;

wherein the sample of tuples includes data for some but not all tuples in the relation;

determining whether a certain candidate dependency from a search space of candidate functional dependencies exists within the sample;

wherein said certain candidate dependency is based on a certain determining set of one or more attributes that determines a given attribute;

if said certain candidate dependency exists within the sample, then performing the steps of:

determining whether the certain candidate dependency exists within the entire relation;

removing from the search space candidate functional dependencies that:

determine the given attribute, and have a determining set that determines said certain determining set; and foregoing determining whether a candidate functional dependency removed from the search space exists within the sample; and if said certain candidate dependency exists within the entire relation, storing data which indicates that said certain candidate dependency is a functional dependency that holds within the relation.

14. The machine-readable medium of claim 13, wherein the instructions that cause the one or more processors to perform the step of determining whether the certain candidate dependency exists within the entire relation include instructions which, when executed by the one or more processors, cause the one or more processors to perform the step of constructing a database statement designed to yield a result that specifies whether the certain candidate dependency exists in the relation.

15. The machine-readable medium of claim 13, wherein the instructions that cause the one or more processors to perform the step of generating a sample of tuples include instructions which, when executed by the one or more processors, cause the one or more processors to perform the step of randomly generating a sample of tuples.

16. The machine-readable medium of claim 13, wherein the size of the sample is based on a memory limit.

17. A machine-readable volatile or non-volatile medium storing one or more sequences of instructions for discovering functional dependencies within a relation, which instructions, when executed by one or more processors, cause the one or more processors to perform steps comprising:

generating a sample of tuples from the relation, said tuples including a plurality of attributes;

determining whether a plurality of candidate functional dependencies in a search space exist in the sample, each candidate dependency of said plurality of candidate functional dependencies having a determining set of one or more attributes of the tuples;

wherein said search space is associated with levels, each level of said levels containing candidate dependencies of the search space that have a particular number of member attributes in the respective determining set, wherein an order is associated with levels and is based on the particular number of members in the determining sets in the respective candidate dependencies for each level of said levels;

wherein determining whether a plurality of candidate functional dependencies in a search space exist within the relation includes:

for each level of said search space beginning with the highest level:

for each candidate dependency in said each level, determining whether said each candidate dependency exists in the sample as a nominal dependency;

for each candidate dependency in said each level determined to be a nominal dependency, determining whether the nominal dependency exists within the entire relation; and for each nominal dependency determined to exist in the entire relation, removing from the search space one or more candidate dependencies:

at a level lower than said each level of said each nominal dependency, and that have a determining set that includes the determining set of said each nominal dependency.

18. The machine-readable medium of claim 17, wherein the instructions that cause the one or more processors to perform the step of determining whether the nominal dependency exists within the entire relation include instructions which, when executed by the one or more processors, cause the one or more processors to perform the step of constructing a database statement designed to yield a result that specifies whether the nominal dependency exists in the relation.

19. The machine-readable medium of claim 17, wherein the instructions that cause the one or more processors to perform the step of generating a sample of tuples include instructions which, when executed by the one or more processors, cause the one or more processors to perform the step of randomly generating a sample of tuples.

20. The machine-readable medium of claim 17, wherein the size of the sample is based on a memory limit.

21. A machine-readable volatile or non-volatile medium storing one or more sequences of instructions for discovering functional dependencies within a relation, which instructions, when executed by one or more processors, cause the one or more processors to perform steps comprising:
generating a sample of tuples from the relation, said tuples including a plurality of attributes;
determining whether a plurality of candidate functional dependencies in a search space exist in the sample, each candidate dependency of said plurality of candidate functional dependencies having a determining set of one or more attributes of the tuples;
wherein said search space is associated with levels, each level of said levels containing candidate dependencies of the search space that have a particular number of member attributes in the respective determining set, wherein an order is associated with levels and is based on the particular number of members in the determining sets in the respective candidate dependencies for each level of said levels;
wherein determining whether a plurality of candidate functional dependencies in a search space exist within the relation includes:
for each level of said search space beginning with the highest level:
for each candidate dependency in said each level, determining whether said each candidate dependency exists in the sample as a nominal dependency,
for each nominal dependency determined to exist in the sample, removing from the search space one or more candidate dependencies:
at a level lower than said each level of said each nominal dependency, and
that have a determining set that includes the determining set of said each nominal dependency;
for each nominal dependency determined to exist in the sample, determining whether the nominal dependency exists within the entire relation.

22. The machine-readable medium of claim 21, wherein the instructions that cause the one or more processors to perform the step of determining whether the nominal dependency exists within the entire relation include instructions which, when executed by the one or more processors, cause the one or more processors to perform the step of constructing a database statement designed to yield a result that specifies whether the nominal dependency exists in the relation.

23. The machine-readable medium of claim 21, wherein the instructions that cause the one or more processors to perform the step of generating a sample of tuples include instructions which, when executed by the one or more processors, cause the one or more processors to perform the step of randomly generating a sample of tuples.

24. The machine-readable medium of claim 21, wherein the size of the sample is based on a memory limit.

25. The method of claim 1, further comprising normalizing the relation based on said functional dependency that holds within the relation.

26. The method of claim 1, further comprising determining, based on said functional dependency that holds within the relation, one or more dimensions by which to categorize data in the relation.

27. The machine-readable medium of claim 13, wherein the one or more sequences of instructions further comprise instructions which, when executed by the one or more processors, cause the one or more processors to perform the step of normalizing the relation based on said functional dependency that holds within the relation.

28. The machine-readable medium of claim 13, wherein the one or more sequences of instructions further comprise instructions which, when executed by the one or more processors, cause the one or more processors to perform the step of determining, based on said functional dependency that holds within the relation, one or more dimensions by which to categorize data in the relation.

* * * * *

UNITED STATES PATENT AND TRADEMARK OFFICE
CERTIFICATE OF CORRECTION

PATENT NO. : 7,873,628 B2  
APPLICATION NO. : 11/388680  
DATED : January 18, 2011  
INVENTOR(S) : Yu Gong et al.

Page 1 of 1

It is certified that error appears in the above-identified patent and that said Letters Patent is hereby corrected as shown below:

On Title Pg. 2, Item (56) under "Other Publications", line 10, delete "SIGMODS/PODS" and insert -- SIGMOD/PODS --, therefor.

On Title Pg. 2, Item (56) under "Other Publications", line 21, delete "Tilbury" and insert -- Tilburg --, therefor.

In column 3, line 31, delete "any body" and insert -- anybody --, therefor.

In column 5, line 65, delete "10," and insert -- 110, --, therefor.

Signed and Sealed this
Thirteenth Day of September, 2011

David J. Kappos
*Director of the United States Patent and Trademark Office*